United States Patent
Ohno

(10) Patent No.: US 12,257,870 B2
(45) Date of Patent: Mar. 25, 2025

(54) ELECTRIC SUSPENSION APPARATUS AND ELECTRIC MOTOR CONTROLLER

(71) Applicant: HONDA MOTOR CO., LTD., Tokyo (JP)

(72) Inventor: Satoshi Ohno, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 262 days.

(21) Appl. No.: 18/178,646

(22) Filed: Mar. 6, 2023

(65) Prior Publication Data

US 2023/0311604 A1 Oct. 5, 2023

(30) Foreign Application Priority Data

Mar. 31, 2022 (JP) .................. 2022-058329

(51) Int. Cl.
*B60G 17/00* (2006.01)
*B60G 17/015* (2006.01)
*B60G 17/0165* (2006.01)

(52) U.S. Cl.
CPC ..... *B60G 17/0157* (2013.01); *B60G 17/0165* (2013.01); *B60G 2202/42* (2013.01)

(58) Field of Classification Search
CPC ........ B60G 17/0157; B60G 17/0165; B60G 17/06; B60G 2202/42; B60G 13/18; B60G 2300/60; B60G 2400/0523; B60G 2400/204

USPC ..................................... 701/37–40
See application file for complete search history.

(56) References Cited

U.S. PATENT DOCUMENTS 11,299,001 B2 * 4/2022 Ohno ............... B60G 17/0162
2020/0324605 A1 10/2020 Ohno et al.

FOREIGN PATENT DOCUMENTS

JP 2007-118714 A 5/2007
JP 2020-172228 A 10/2020

* cited by examiner

*Primary Examiner* — Hai H Huynh
(74) *Attorney, Agent, or Firm* — Rankin, Hill & Clark LLP

(57) ABSTRACT

An electric suspension apparatus includes a return prevention circuit and a discharge controller. The return prevention circuit is configured to operate in one of operation modes including a return prevention mode of preventing a current from flowing from power storage to a power supply and a return allowance mode of allowing a current to flow from the power storage to the power supply. The discharge controller is configured to determine whether an electric motor is in regenerative operation. In response to determining that the electric motor is in regenerative operation, the discharge controller is configured to set the return prevention circuit to operate in the return prevention mode. In response to determining that the electric motor is not in regenerative operation, the discharge controller is configured to set the return prevention circuit to operate in the return allowance mode.

5 Claims, 6 Drawing Sheets

ELECTRIC SUSPENSION APPARATUS AND ELECTRIC MOTOR CONTROLLER

CROSS-REFERENCE STATEMENT

The present application is based on, and claims priority from, Japanese Patent Application Number 2022-058329, filed Mar. 31, 2022, the disclosure of which is hereby incorporated by reference herein in its entirety.

BACKGROUND

Technical Field

The present invention relates to an electric suspension apparatus and an electric motor controller.

Related Art

There is an ongoing trend towards providing access to sustainable transportation systems that take into consideration vulnerable groups such as children and the elderly who are among traffic participants. To realize this, the applicant has been working on research and development to further improve traffic safety and convenience, among the efforts including development concerning vehicle behavior stability such as performance enhancement of an electric suspension apparatus.

Regarding a power supply for driving an electric suspension apparatus, Japanese Unexamined Patent Application Publication Number 2007-118714 (hereinafter "Patent Literature 1") describes selecting either a capacitor or a battery based on a vehicle state quantity. That is, an invention of Patent Literature 1 determines whether a generated vibration is a high-frequency vibration or a low-frequency vibration based on a steering state and a vibration amplitude. When the high-frequency vibration is to be suppressed to prioritize ride quality, the capacitor is selected as the power source. When the low-frequency vibration is to be suppressed to prioritize posture control, the battery is selected as the power source. Japanese Unexamined Patent Application Publication Number 2020-172228 (hereinafter "Patent Literature 2") describes a device that provides a command on a driving force to an electric suspension apparatus in accordance with a vehicle speed, a yaw rate, a stroke position, and the like. It is possible to employ the same control methods of Patent Literatures 1 and 2, and in this respect, disclosures of the two applications are incorporated herein by reference.

For a stable vehicle behavior, an electric suspension apparatus needs to respond appropriately to a vibration or the like that is applied to the vehicle. A conventional electric suspension apparatus does not always respond appropriately to the vibration or the like that is applied to the vehicle.

SUMMARY

One aspect of the disclosure provides an electric suspension apparatus including an electromagnetic actuator, a controller, and a power supply.

The electromagnetic actuator is arranged between a wheel and a vehicle body and includes an electric motor. The controller includes an information acquisition part, a driving force calculation part, and a drive controller. The controller is configured to acquire, as the information acquisition part, information on a stroke speed of the electromagnetic actuator. The controller is configured to output, as the driving force calculation part, a driving force command value concerning the electric motor. The driving force command value is based on the stroke speed. The controller is configured to control, as the drive controller, driving of the electric motor based on the driving force command value. The power supply is configured to output a first voltage to the drive controller. The drive controller includes power storage, a drive circuit, a return prevention circuit, and a discharge controller. The power storage is configured to be chargeable by the power supply. The drive circuit is configured to modulate a second voltage based on the driving force command value and apply the modulated second voltage to the electric motor. The second voltage is a terminal voltage of the power storage. The return prevention circuit is configured to operate in one of operation modes. The operation modes include a return prevention mode of preventing a current from flowing from the power storage to the power supply and a return allowance mode of allowing a current to flow from the power storage to the power supply. The discharge controller is configured to determine whether the electric motor is in regenerative operation, set the return prevention circuit to operate in the return prevention mode in response to determining that the electric motor is in regenerative operation, and set the return prevention circuit to operate in the return allowance mode in response to determining that the electric motor is not in regenerative operation.

DETAILED DESCRIPTION

Figure 1:
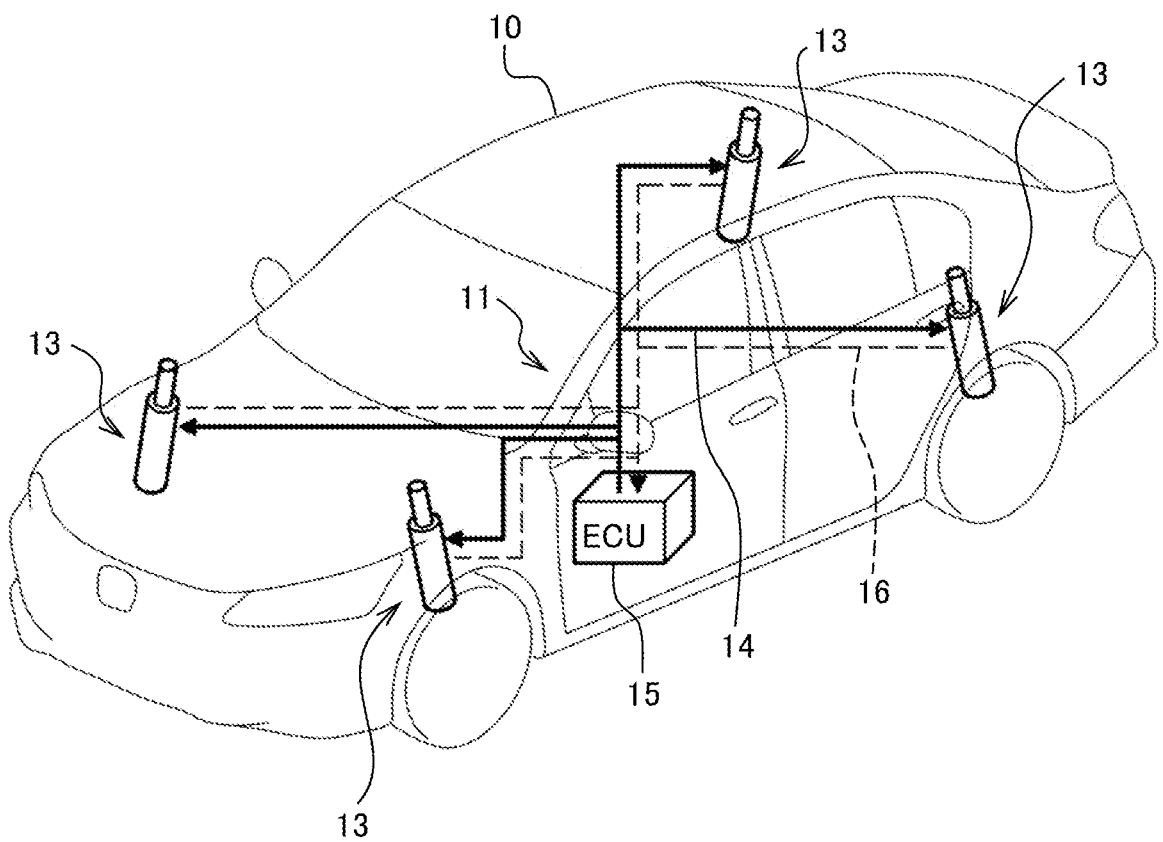
FIG. 1 is a diagram showing an overall configuration of an electric suspension apparatus according to a first embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

First Embodiment

Overall Configuration of First Embodiment

An electric suspension apparatus according to a first embodiment of the disclosure will be described in detail below with reference to drawings.

In the drawings described below, members having a common function are denoted by a common reference sign. For convenience of description, a size or shape of a member may be illustrated schematically in a deformed or an exaggerated manner.

FIG. 1 is a diagram of an overall configuration of an electric suspension apparatus 11 according to a first embodiment.

As shown in FIG. 1, the electric suspension apparatus 11 according to the present embodiment includes a plurality of electromagnetic actuators 13 and an electronic control unit (ECU) 15 (an electric motor controller). The plurality of electromagnetic actuators 13 are configured so that an electromagnetic actuator 13 is provided for each wheel of the vehicle 10. Each electromagnetic actuator 13 is provided with an electric motor (not shown). A power supply line 14 (shown by a solid line in FIG. 1) and a signal line 16 (shown by a broken line in FIG. 1) are disposed between the ECU 15 and the plurality of electromagnetic actuators 13. The power supply line 14 is used to supply drive control power from the ECU 15 to the plurality of electromagnetic actuators 13. The signal line 16 is used to transmit an electrical angle signal of the electric motor from the plurality of electromagnetic actuators 13 to the ECU 15.

In the present embodiment, four electromagnetic actuators 13 are provided for the wheels of the vehicle 10, with one electromagnetic actuator 13 provided for each of the front wheels (left front wheel and right front wheel) and rear wheels (left rear wheel and right rear wheel). The electromagnetic actuator 13 provided for each wheel is driven and controlled independently of one another and in accordance with the expansion/contraction movement that occurs for a corresponding wheel. In the present embodiment, each of the plurality of electromagnetic actuators 13 includes a common configuration unless otherwise specified. Therefore, the plurality of electromagnetic actuators 13 will be described by describing a configuration of one electromagnetic actuator 13.

Figure 2:
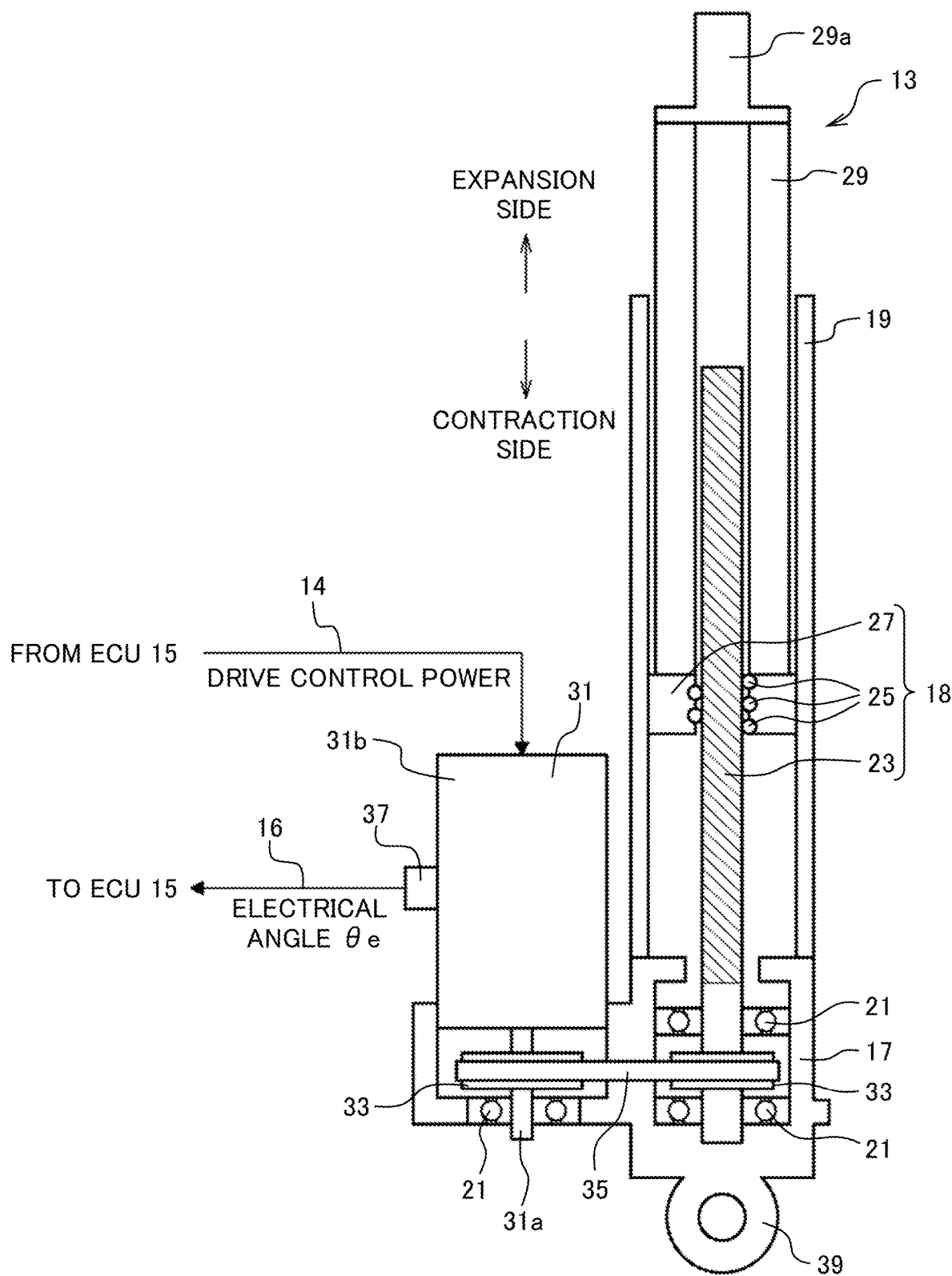
FIG. 2 is a partially cross-sectioned view of an electromagnetic actuator constituting a part of the electric suspension apparatus.

FIG. 2 is a partially cross-sectioned view of an electromagnetic actuator 13 constituting a part of the electric suspension apparatus 11.

As shown in FIG. 2, the electromagnetic actuator 13 includes a base housing 17, an outer tube 19, a ball bearing 21, a ball screw shaft 23, a plurality of balls 25, a nut 27, an inner tube 29, and an electric motor 31. The electric motor 31 is, for example, a permanent-magnet synchronous motor that includes a permanent magnet in a rotor and U-phase, V-phase, and W-phase windings in a stator.

The base housing 17 rotatably supports a base end side of the ball screw shaft 23 via the ball bearing 21 so that the ball screw shaft 23 is axially rotatable. The outer tube 19 is provided on the base housing 17 and accommodates a ball screw mechanism 18 that includes the ball screw shaft 23, the plurality of balls 25, and the nut 27. The plurality of balls 25 roll along a screw groove of the ball screw shaft 23. The nut 27 is engaged with the ball screw shaft 23 via the plurality of balls 25 and converts rotational motion of the ball screw shaft 23 into linear motion. The inner tube 29 that is connected to the nut 27 is displaced integrally with the nut 27 in an axial direction of the outer tube 19.

A shown in FIG. 2 and to transmit a rotational driving force to the ball screw shaft 23, the electromagnetic actuator 13 includes the electric motor 31, a pair of pulleys 33, and a belt 35. The electric motor 31 is provided on the base housing 17 to be arranged in parallel with the outer tube 19. One pulley 33 is attached to a motor shaft 31a of the electric motor 31 and another pulley 33 is attached to the ball screw shaft 23. The belt 35 is wrapped around the pair of pulleys 33 for transmitting the rotational driving force of the electric motor 31 to the ball screw shaft 23.

The electric motor 31 is provided with a resolver 37 for detecting a rotation angle signal of the electric motor 31. The resolver 37 is configured to detect an electrical angle θe of the motor, making it possible to calculate, based on the electrical angle θe, a position of the ball screw mechanism 18 relative to the outer tube 19, in other words a stroke position. The electrical angle θe of the motor is sent to the ECU 15 via the signal line 16. The rotational drive of the electric motor 31 is controlled in accordance with the drive control power that is supplied by the ECU 15 to each of the plurality of electromagnetic actuators 13 via the power supply line 14.

As shown in FIG. 2, in the present embodiment, a dimension in the axial direction of the electromagnetic actuator 13 is shortened by employing a layout in which the motor shaft 31a of the electric motor 31 and the ball screw shaft 23 are arranged substantially in parallel to be connected to each other. However, another layout may be employed in which the motor shaft 31a of the electric motor 31 and the ball screw shaft 23 are coaxially arranged to be connected to each other.

As shown in FIG. 2, in the electromagnetic actuator 13 according to the present embodiment, a connecting portion 39 is provided at a lower end of the base housing 17. The connecting portion 39 is connected and fixed to an unsprung member (not shown; a lower arm, a knuckle, or the like on a wheel side). On the other hand, the upper end 29a of the inner tube 29 is connected and fixed to a sprung member (not shown; a strut tower, or the like on a vehicle body side). In short, the electromagnetic actuator 13 is arranged in parallel with a spring member (not shown) provided between the vehicle body and the wheel of the vehicle 10.

The electromagnetic actuator 13 configured as described above operates as follows.

Consider a case, for example, where a propulsive force related to an upward vibration is inputted to the connecting portion 39 from the wheel side of the vehicle 10. In this case, the inner tube 29 and the nut 27 try to integrally descend relative to the outer tube 19 to which the propulsive force related to the upward vibration is applied. In response to this, the ball screw shaft 23 tries to rotate in a direction that follows a downward movement of the nut 27. At this time, a rotational driving force of the electric motor 31 is generated in a direction that prevents the downward movement of the nut 27. The rotational driving force of the electric motor 31 is transmitted to the ball screw shaft 23 via the belt 35.

In this way, by applying a reaction force (damping force), which acts against the propulsive force related to the upward vibration, to the ball screw shaft 23, vibration transmitted from the wheel side to the vehicle body side is attenuated.

Figure 3:
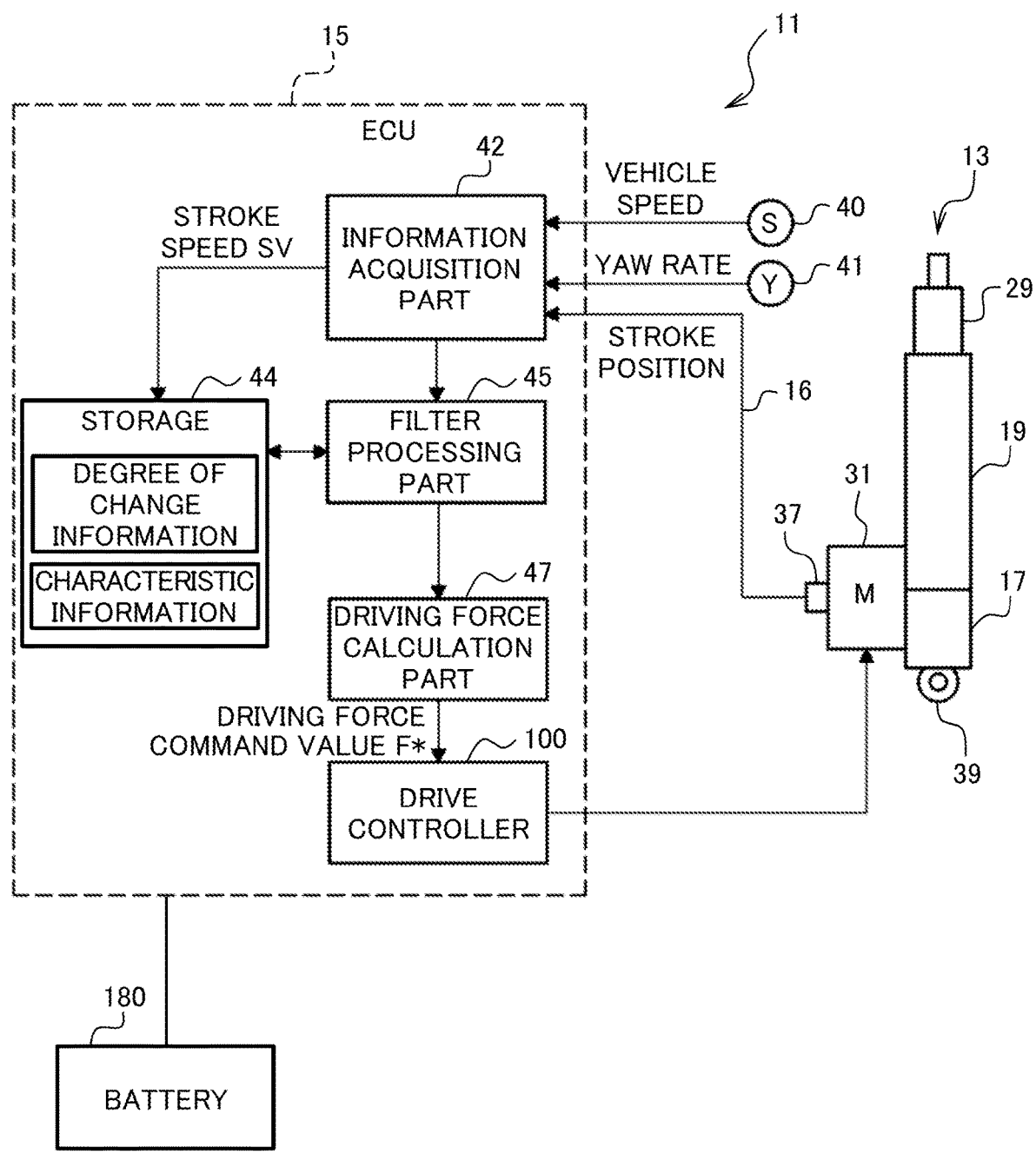
FIG. 3 is a diagram showing an internal and peripheral configuration of an ECU provided in the electric suspension apparatus.

FIG. 3 is a diagram showing internal and peripheral configurations of the ECU 15 that is provided in the electric suspension apparatus 11 of the present embodiment.

The ECU 15 includes a microcomputer that is configured to perform various arithmetic processing. The ECU 15 includes a drive control function for generating a driving force related to vibration damping of the vehicle body. The drive control function is achieved by controlling the driving of each of the plurality of electromagnetic actuators 13 based on the electrical angle θe of the motor that is detected by the resolver 37.

In order to realize such a drive control function, the ECU 15 includes an information acquisition part 42, a characteristic information storage 44, a filter processing part 45, a driving force calculation part 47, and a drive controller 100 as shown in FIG. 3. A battery 180 (power supply) supplies power to the ECU 15.

The information acquisition part 42 acquires the stroke position based on the electrical angle θe of the motor that is detected by the resolver 37 and obtains information on a stroke speed SV by differentiating the stroke position with respect to time. Further, as shown in FIG. 3, the information acquisition part 42 acquires information on vehicle speed that is detected by a vehicle speed sensor 40 and a yaw rate that is detected by a yaw rate sensor 41. Information on the stroke speed SV, vehicle speed, and yaw rate obtained by the information acquisition part 42 is sent to the characteristic information storage 44 and the filter processing part 45.

The filter processing part 45 may be configured from an analog circuit or a digital circuit (digital filter). The filter processing part 45 may be configured from software or may be configured from hardware. Further, the filter processing part 45 may be configured from a combination of software and hardware.

The driving force calculation part 47 receives a filter processed stroke velocity signal as input, obtains a target damping force, and calculates a driving force command value F* for realizing the target damping force. The driving force command value F* is a target value of the driving force that is generated by the electric motor 31 and is supplied to the drive controller 100. Details relating to the information acquisition part 42, characteristic information storage 44, filter processing part 45, and driving force calculation part 47 of the present embodiment may be found in the disclosures of Patent Literature 2 (Japanese Unexamined Patent Application Publication Number 2020-172228, filed Apr. 12, 2019) or U.S. Patent Application Publication Number US 2020/0324605 A1 (filed Apr. 13, 2020), and the disclosures of these two applications are incorporated herein by reference.

Configuration of Drive Controller 100

Figure 4:
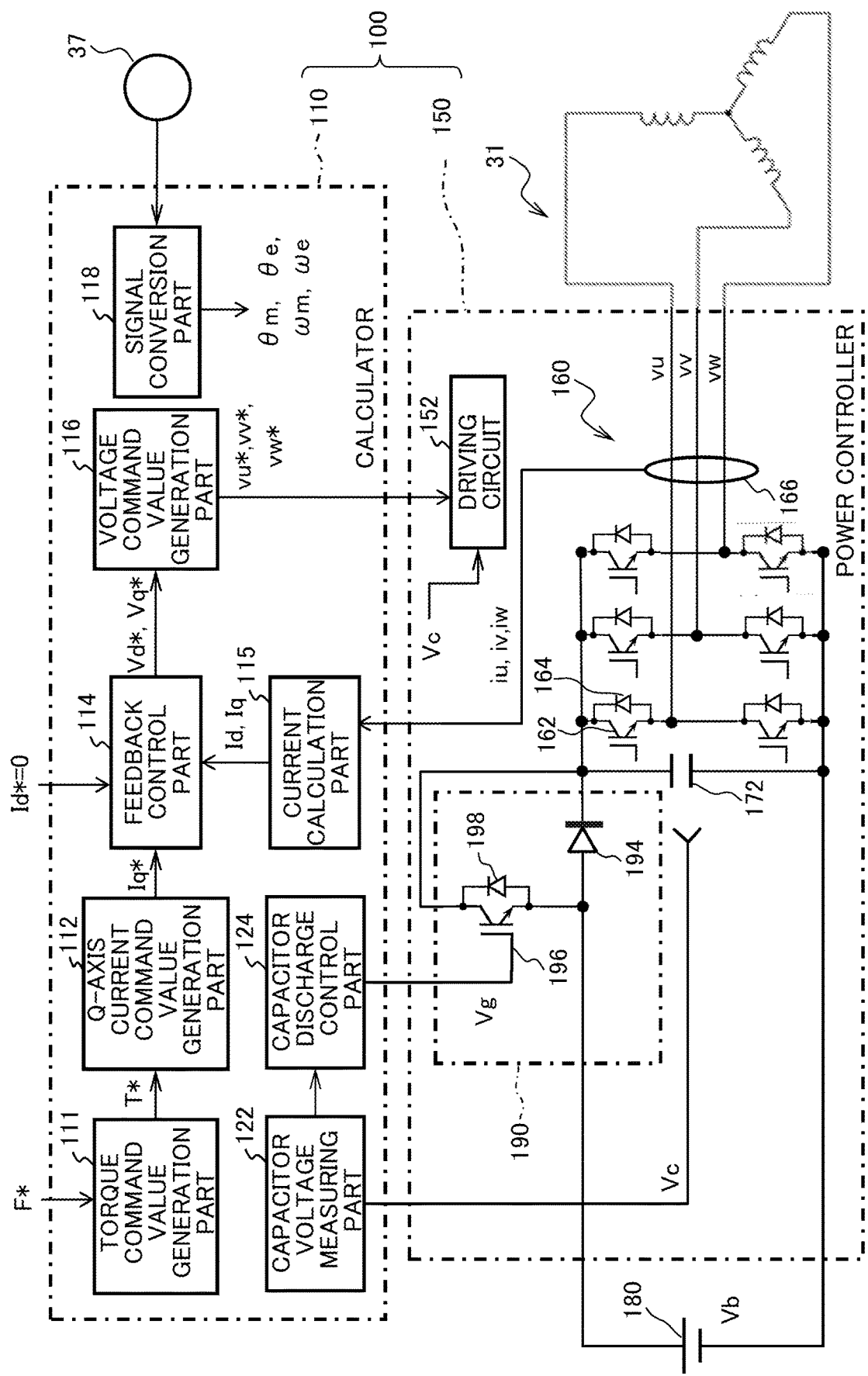
FIG. 4 is a block diagram showing a configuration of a drive controller.

FIG. 4 is a block diagram showing a configuration of the drive controller 100.

In FIG. 4, the drive controller 100 includes a calculator 110 (drive circuit) and a power controller 150. The calculator 110 includes a torque command value generation part 111, a q-axis current command value generation part 112, a feedback control part 114, a current calculation part 115, a voltage command value generation part 116, a signal conversion part 118, a capacitor voltage measuring part 122, and a capacitor discharge control part 124 (discharge controller).

The power controller 150 includes a driving circuit 152 (drive circuit), a bridge circuit 160 (drive circuit), a capacitor 172 (power storage), and a return prevention circuit 190. The return prevention circuit 190 includes a diode 194, a switching element 196, and a diode 198.

The bridge circuit 160 includes six bridge-connected switching elements 162, six diodes 164 that are each connected anti-parallel to a corresponding switching element 162, and a current sensor 166. In the illustrated example, the above-described switching elements 162 and 196 are insulated-gate bipolar transistors (IGBTs). The current sensor 166 detects three-phase alternating currents iu, iv, and iw that flow through the U-phase, V-phase, and W-phase windings of the electric motor 31.

The above-described battery 180 outputs a predetermined battery voltage Vb (first voltage). A terminal voltage of the capacitor 172 in the power controller 150 is referred to as a capacitor voltage Vc (second voltage). When the capacitor voltage Vc is lower than the battery voltage Vb, a charging current flows from the battery 180 to the capacitor 172 via the diode 194 so that the capacitor voltage Vc becomes substantially equal to the battery voltage Vb. When the capacitor voltage Vc is higher than the battery voltage Vb and the switching element 196 is turned on, a discharge current flows from the capacitor 172 to the battery 180 so that the capacitor voltage Vc becomes substantially equal to the battery voltage Vb.

When the capacitor voltage Vc is higher than the battery voltage Vb and the switching element 196 is turned off, a discharge current does not flow from the capacitor 172 to the battery 180. Therefore, when the electric motor 31 is in regenerative operation, the capacitor voltage Vc is maintained at a higher value than the battery voltage Vb. When the driving circuit 152 receives voltage command values vu*, vv*, and vw* (details will be described later) of the respective U-phase, V-phase, and W-phase of the electric motor 31 from the calculator 110, the driving circuit 152 uses pulse width modulation (PWM) to modulate these voltage command values. The capacitor voltage Vc is also supplied to the driving circuit 152. Thus, even for the same voltage command value, the duty cycle of a pulse width modulated wave is set to be lower by the driving circuit 152 the higher the capacitor voltage Vc.

A generated pulse width modulated wave is applied to the gate terminal of each switching element 162 to switch the ON/OFF state of each switching element 162. As a result, the bridge circuit 160 applies three phase AC voltages vu, vv, and vw to the U-phase, V-phase, and W-phase windings (reference signs omitted) of the electric motor 31.

In the calculator 110, the signal conversion part 118 receives an electrical angle θe of the motor from the resolver 37 and outputs a stroke position and a mechanical angle θm based on the electrical angle θe. Here, the electrical angle θe is equal to a result obtained by multiplying the mechanical angle θm by N/2 (where N is the number of poles of the electric motor 31). Further, the signal conversion part 118 acquires a mechanical angular frequency ωm and an electrical angular frequency ωe by differentiating the mechanical angle θm and the electrical angle θe with respect to time and supplies the acquired information to each part in the drive controller 100.

The torque command value generation part 111 outputs a torque command value T* based on the driving force command value F* and a system gear ratio of the electromagnetic actuator. The system gear ratio is determined by specifications of the ball screw mechanism 18, the belt 35 and the pulleys 33. Here, a rotational coordinate rotating at an electrical angular frequency ωe is assumed, a direction of the main magnetic flux of the rotor of the electric motor 31 is represented by a d-axis (the direction of the main flux runs in parallel with the d-axis), and an axis orthogonal to the d-axis is represented by a q-axis. Assuming that the torque constant of the electric motor 31 is Kq, the q-axis current command value generation part 112 outputs a q-axis current command value Iq* such that Iq*=(T*/Kq).

The current calculation part 115 performs, based on the electrical angle θe received by the signal conversion part 118, coordinate conversion of the alternating currents iu, iv, and iw that have been detected by the current sensor 166 and outputs the result as a d-axis current measurement value Id and a q-axis current measurement value Iq.

Based on the q-axis current command value Iq* and q-axis current measurement value Iq, the feedback control part 114 performs a current feedback calculation and outputs a q-axis voltage command value Vq*.

Based on the d-axis current command value Id* (which is, for example, "0") and the d-axis current measurement value Id, the feedback control part 114 performs a current feedback calculation and outputs a d-axis voltage command value Vd*. For example, a proportional integral (PI) control using a proportional gain Kp and an integral gain Ki may be employed for the current feedback calculation.

The voltage command value generation part 116 performs coordinate conversion of the d-axis voltage command value Vd* and the q-axis voltage command value Vq* based on the electrical angle θe and outputs the result as voltage command values vu*, vv*, and vw* to the driving circuit 152. The voltage command value generation part 116 limits the maximum value of the voltage command values vu*, vv*, and vw* to the capacitor voltage Vc. According to the above-described configuration of the calculator 110, the present embodiment is capable of controlling the d-axis and q-axis current measurement values Id and Iq to follow the d-axis and q-axis current command values Id* and Iq*.

Here, depending on an operating point of the electric motor 31, such as when the electric motor 31 is rotating at high speed, the voltage command value generation part 116 may set the voltage command values vu*, vv*, and vw* to the capacitor voltage Vc, which is the maximum value thereof. In this case, a situation may arise in which the d-axis and q-axis axis measurement currents Id and Iq cannot be made to follow the d-axis and q-axis current command values Id* and Iq*. That is, the electric motor 31 is driven in a state in which there is a certain degree of deviation of the d-axis and q-axis current measurement values Id and Iq from the d-axis and q-axis current command values Id* and Iq*.

At an operating point at which the d-axis and q-axis current measurement values Id and Iq deviate from the d-axis and q-axis current command values Id* and Iq*, a usage range of the q-axis voltage command value Vq* can be increased by increasing the capacitor voltage Vc and, as a result, current following capability can be improved. For example, even when the capacitor voltage Vc is low at an initial state and the current following capability is insufficient, by increasing the capacitor voltage Vc through storing regenerative power in the capacitor 172, the current following capability can be improved.

The capacitor voltage measuring part 122 measures the capacitor voltage Vc which is a terminal voltage of the capacitor 172. The capacitor discharge control part 124 sets a gate voltage Vg of the switching element 196 to a predetermined turn-on voltage Von when the capacitor voltage Vc exceeds a predetermined threshold voltage Vcth during a regenerative operation of the electric motor 31.

As a result, the switching element 196 is turned on and, through discharge of the capacitor 172, the capacitor voltage Vc approaches the battery voltage Vb. In one or more embodiments, the threshold voltage Vcth is higher than the battery voltage Vb and lower than the withstand voltage of the capacitor 172. For example, the threshold voltage Vcth may be set to about 0.9 times the withstand voltage of the capacitor 172.

When the electric motor 31 is in regenerative operation and the capacitor voltage Vc is less than the threshold voltage Vcth, the capacitor discharge control part 124 sets the gate voltage Vg of the switching element 196 to a predetermined turn-off voltage Voff. Similarly, when the electric motor 31 is in power running operation, the capacitor discharge control part 124 sets the gate voltage Vg of the switching element 196 to the predetermined turn-off voltage Voff.

As a result, the switching element 196 is turned off. When the switching element 196 is in a turned off state during the regenerative operation, the capacitor 172 is charged by the electric power regenerated by the electric motor 31, and the capacitor voltage Vc gradually increases. The higher the capacitor voltage Vc becomes, the easier it becomes for the AC voltages vu, vv, and vw to follow the voltage command values vu*, vv*, and vw* in the bridge circuit 160.

Operation of First Embodiment

Operation of the present embodiment will be described.

Figure 5:
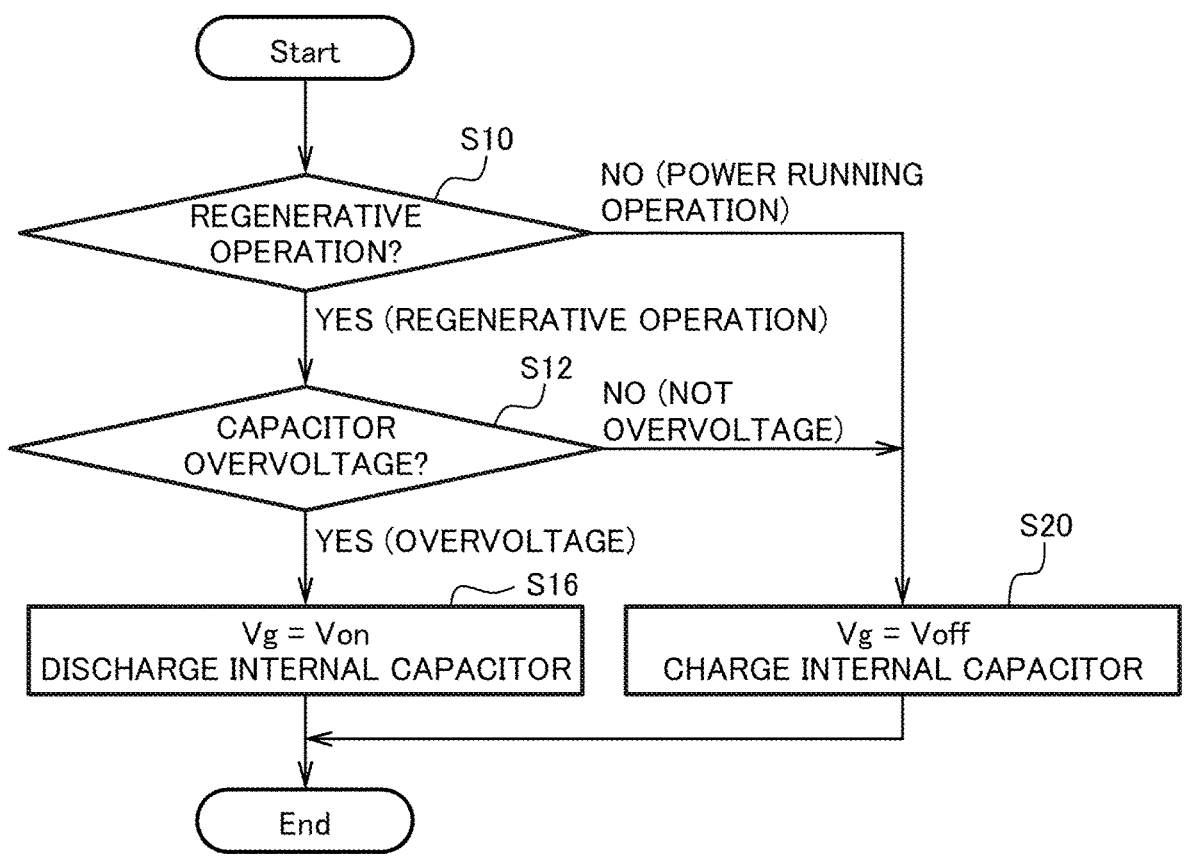
FIG. 5 is a flowchart showing an example of a discharge processing routine executed by a capacitor discharge control part.

FIG. 5 is a flowchart showing an example of a discharge processing routine that is executed by the capacitor discharge control part 124 (see FIG. 4). This routine is executed at a predetermined control cycle.

In FIG. 5, when the process proceeds to step S10, the capacitor discharge control part 124 determines whether the electric motor 31 is in regenerative operation. This may be achieved, for example, by detecting whether the motor torque being generated by the electric motor 31 is a positive or negative torque and detecting whether the direction of the motor rotation is positive or negative, and then determining that the answer is "Yes", the electric motor 31 is in regenerative operation, when the two signs do not coincide (S10, "Yes") or determining that the answer is "No", the electric motor 31 is in power running operation, when the two signs coincide (S10, "No"). (For example, when both the motor torque and the direction of the motor rotation are positive or both the motor torque and the direction of the motor rotation are negative, then the electric motor 31 is determined to be in power running operation.)

When the answer is determined to be "Yes" in step S10, the process proceeds to step S12 and the capacitor discharge control part 124 determines whether the capacitor 172 is in a state of overvoltage. For example, the capacitor discharge control part 124 may determine that the capacitor 172 is in a state of overvoltage when the capacitor voltage Vc exceeds the threshold voltage Vcth (the threshold voltage Vcth may for example be 0.9 times the withstand voltage of the capacitor 172). When the answer is determined to be "Yes" in step S12, the process proceeds to step S16 and the capacitor discharge control part 124 sets the gate voltage Vg to the turn-on voltage Von. As a result, the switching element 196 is turned on, the capacitor 172 is discharged, and the discharged current is supplied to the battery 180. As a result, the capacitor voltage Vc gradually decreases thereafter.

When the answer is determined to be "No" in step S10 (when the electric motor 31 is in power running operation) or S12 (when the electric motor 31 is in regenerative operation and the capacitor 172 is not in an overvoltage state), the process proceeds to step S20. In step S20, the capacitor discharge control part 124 sets the gate voltage Vg to the turn-off voltage Voff. As a result, the switching element 196 is set to an OFF state. When the electric motor 31 is in regenerative operation, the capacitor 172 is charged by the electric power regenerated by the electric motor 31 and the capacitor voltage Vc gradually increases.

When the electric motor 31 is in regenerative operation, electric power is continuously supplied from the electric motor 31 to the capacitor 172. Accordingly, the capacitor 172 switches between a discharge state and non-discharge state in units of the control cycle in which the discharge processing routine (FIG. 5) is executed. Therefore, during the regenerative operation, the capacitor voltage Vc is maintained near the threshold voltage Vcth while slightly fluctuating.

Figure 6:
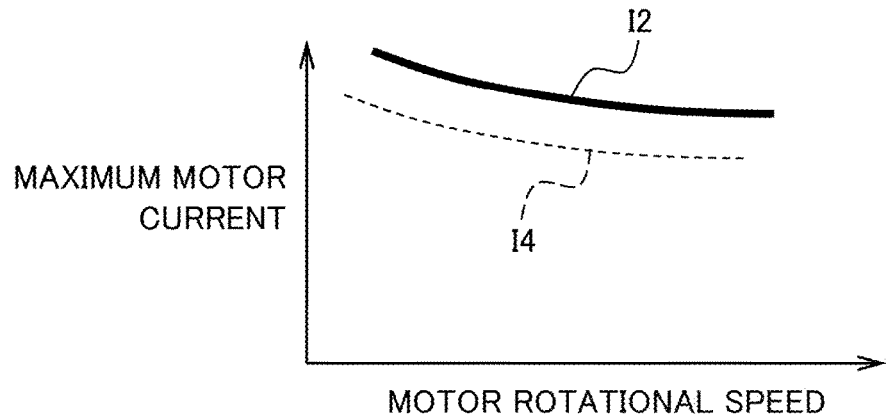
FIG. 6 is a diagram showing a relationship between a maximum motor current and a motor rotation speed during regenerative operation.

FIG. 6 shows a relationship between the maximum motor current and the motor rotational speed during a regenerative operation. The motor current may be considered to be, for example, the q-axis current measurement value Iq (see FIG. 4).

In FIG. 6, the vertical axis represents a current value and the horizontal axis represents a rotational speed. Current characteristics I2 and I4 indicate respective characteristics for the present embodiment and a comparative example of the maximum current value (effective value) of the motor current that can be supplied to the electric motor 31 in relation to the rotational speed of the electric motor 31. In the comparative example, the diode 194, switching element 196, and the diode 198 (see FIG. 4) are excluded and the capacitor voltage Vc is always substantially equal to the battery voltage Vb. As shown in the drawing, according to the current characteristic I2 of the present embodiment, a current that can be supplied to the electric motor 31 during the regenerative operation can be increased in comparison to the current characteristic I4 of the comparative example.

Figure 7:
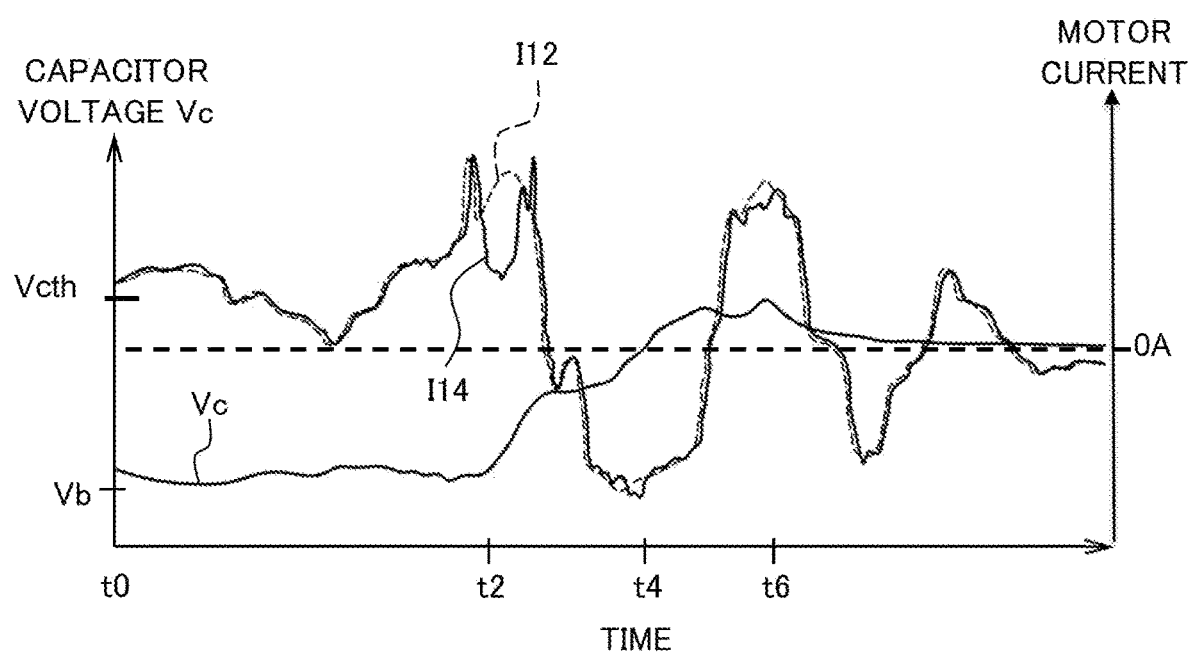
FIG. 7 is a diagram showing a relationship between a capacitor voltage, measured current, and target current.

FIG. 7 is a diagram showing a relationship among the capacitor voltage Vc, a measured current, and a target current.

In FIG. 7, the horizontal axis represents time and the vertical axis represents a current value or a voltage value. For example, the measured current is the above-described q-axis current measurement value Iq and the target current is the q-axis current command value Iq*. The target current characteristic 112 is a characteristic of a target value of the motor current. The measured current characteristic 114 is a characteristic of a measured value of the motor current. In a period from time t0 to time t2, the capacitor voltage Vc is close to the value of the battery voltage Vb. After time t2, the capacitor voltage Vc increases gradually to a value close to the threshold voltage Vcth.

The target current characteristic 112 has peaks near times t2, t4, and t6. Near time t2, because the capacitor voltage Vc is relatively low, the measured current characteristic 114 is unable to follow the target current characteristic 112. On the other hand, near times t4 and t6, because the capacitor voltage Vc is close to the threshold voltage Vcth and is relatively high, the measured current characteristic 114 is able to follow the target current characteristic 112 sufficiently.

Effect of the Embodiment

According to the above-described embodiment, an electric suspension apparatus (11) includes power storage (172), a drive circuit (110, 152, 160), a return prevention circuit (190), and a discharge controller (124). The power storage (172) is chargeable by a power supply (180). The drive circuit (110, 152, 160) is configured to modulate, based on a driving force command value (F*), a second voltage (Vc) that is a terminal voltage of the power storage (172) and apply the modulated second voltage to an electric motor (31). The return prevention circuit (190) is configured to operate in one of operation modes. The operation modes include a return prevention mode of preventing a current from flowing from the power storage (172) to the power supply (180) and a return allowance mode of allowing a current to flow from the power storage (172) to the power supply (180). The discharge controller (124) is configured to determine whether the electric motor (31) is in regenerative operation, set the return prevention circuit (190) to operate in the return prevention mode in response to determining that the electric motor (31) is in regenerative operation, and set the return prevention circuit (190) to operate in the return allowance mode in response to determining that the electric motor (31) is not in regenerative operation.

Thus, according to the present embodiment, the electric suspension apparatus 11 can respond appropriately. For example, when the electric motor 31 is in regenerative operation, the power storage (172) may be charged by the regenerative electric power and the second voltage (Vc) may be increased. As a result, it is possible to improve the current following capability with respect to input from the road surface at the time of regeneration during regeneration operation and thus improve riding comfort.

In one or more embodiments, the power storage (172) is a capacitor built in the drive controller (100). By employing a capacitor, a charge/discharge response can be enhanced compared to a case where a battery or the like is employed.

In one or more embodiments, the discharge controller (124) is configured to set the return prevention circuit (190) to operate in the return allowance mode when the second voltage (Vc) exceeds a predetermined threshold voltage (Vcth) during the regenerative operation of the electric motor (31). In this way, it is possible to prevent the second voltage (Vc) from becoming overvoltage.

Modified Example

The disclosure is not limited to the above-described embodiments, and various modifications are possible. The embodiments described above are illustrated for the purpose of explaining the disclosure in an easy-to-understand manner. Embodiments of the disclosure are not necessarily limited to those having all the configurations described above. Another configuration may be added to the configuration of the above-described embodiment. A part of the configuration of the above-described embodiment may be replaced with another configuration. Further, control lines and information lines shown in the figures are those considered to aid the description. The control lines and information lines shown in the figures may not necessarily make up all those that are included in a product. In practice, almost all the configurations may be interconnected. Examples of possible modifications to the above embodiments are as follows.

(1) Because hardware of the ECU 15 of the above-described embodiment can be realized with a general-purpose computer, a program or the like that performs the process shown by the flowchart of FIG. 5 and/or various other processes described above may be stored in a non-transitory storage medium or may be distributed via a transmission channel.

(2) Although the process shown in FIG. 5 and other processes described above have been described as software processes run by a program in the above-described embodiment, part or all of the processes may be replaced with hardware processes using an ASIC (Application Specific Integrated Circuit) or FPGA (Field Programmable Gate Array).

(3) The drive controller 100 of the above-described embodiment may be applied not only to an electric suspension apparatus 11, but also to another part of a vehicle or to an electric motor control device incorporated in an apparatus other than a vehicle.

An object of the disclosure includes providing an electric suspension apparatus and an electric motor controller that are capable of appropriately responding to a vibration or the like that is applied to a vehicle.

According to one or more embodiments, it is possible to cause the electric suspension apparatus to respond appropriately, to enhance a performance of the electric suspension apparatus, and to contribute to improving traffic safety and convenience.

What is claimed is:

1. An electric suspension apparatus comprising:
an electromagnetic actuator arranged between a wheel and a vehicle body, the electromagnetic actuator including an electric motor;
a controller including an information acquisition part, a driving force calculation part, and a drive controller; and
a power supply, wherein
the controller is configured to:
acquire, as the information acquisition part, information on a stroke speed of the electromagnetic actuator;
output, as the driving force calculation part, a driving force command value concerning the electric motor, the driving force command value being based on the stroke speed; and
control, as the drive controller, driving of the electric motor based on the driving force command value,
the power supply is configured to output a first voltage to the drive controller,
the drive controller includes:
power storage configured to be chargeable by the power supply;
a drive circuit configured to modulate a second voltage based on the driving force command value and apply the modulated second voltage to the electric motor, the second voltage being a terminal voltage of the power storage;
a return prevention circuit configured to operate in one of operation modes, the operation modes including a return prevention mode of preventing a current from flowing from the power storage to the power supply and a return allowance mode of allowing a current to flow from the power storage to the power supply; and
a discharge controller, and
the discharge controller is configured to:
determine whether the electric motor is in regenerative operation;
set the return prevention circuit to operate in the return prevention mode in response to determining that the electric motor is in regenerative operation; and
set the return prevention circuit to operate in the return allowance mode in response to determining that the electric motor is not in regenerative operation.

2. The electric suspension apparatus according to claim 1, wherein the power storage is a capacitor built in the drive controller.

3. The electric suspension apparatus according to claim 1, wherein,
even while the electric motor is in regenerative operation, the discharge controller is configured to set the return prevention circuit to operate in the return allowance mode in response to the second voltage exceeding a predetermined threshold voltage.

4. An electric motor controller comprising:
a driving force calculation part configured to output a driving force command value concerning an electric motor based on an electrical angle of the electric motor;
a drive controller configured to control driving of the electric motor based on the driving force command value; and
a power supply configured to output a first voltage to the drive controller, wherein
the drive controller includes:
power storage configured to be chargeable by the power supply;
a drive circuit configured to modulate a second voltage based on the driving force command value and apply the modulated second voltage to the electric motor, the second voltage being a terminal voltage of the power storage;
a return prevention circuit configured to operate in one of operation modes, the operation modes including a return prevention mode of preventing a current from flowing from the power storage to the power supply and a return allowance mode of allowing a current to flow from the power storage to the power supply; and
a discharge controller, and
the discharge controller is configured to:
determine whether the electric motor is in regenerative operation;
set the return prevention circuit to operate in the return prevention mode in response to determining that the electric motor is in regenerative operation; and
set the return prevention circuit to operate in the return allowance mode in response to determining that the electric motor is not in regenerative operation.

5. The electric suspension apparatus according to claim 2, wherein
even while the electric motor is in regenerative operation, the discharge controller is configured to set the return prevention circuit to operate in the return allowance mode in response to the second voltage exceeding a predetermined threshold voltage.

* * * * *